United States Patent [19]

Urushibata et al.

[11] Patent Number: 5,258,597
[45] Date of Patent: Nov. 2, 1993

[54] METHOD OF STABILIZING SPOT-WELDING

[75] Inventors: Kenichi Urushibata; Takeshi Kihara, both of Tochigi, Japan

[73] Assignee: Sumitomo Electric Industries, Ltd., Osaka, Japan

[21] Appl. No.: 971,464

[22] Filed: Nov. 4, 1992

[30] Foreign Application Priority Data

Nov. 8, 1991 [JP] Japan ................. 3-291813

[51] Int. Cl.$^5$ .............................. B23K 11/14
[52] U.S. Cl. .................. 219/56.1; 219/91.2; 219/93
[58] Field of Search ............ 219/91.2, 91.21, 93, 219/56.1, 56.21, 92, 56.22; 174/117 F, 117 FF; 29/843, 839, 860, 879

[56] References Cited

U.S. PATENT DOCUMENTS

| 4,870,227 | 9/1989 | Saen et al. | 174/117 FF |
| 4,873,411 | 10/1989 | Saen et al. | 219/93 |

FOREIGN PATENT DOCUMENTS

| 3347241 | 7/1985 | Fed. Rep. of Germany | 219/93 |
| 277864 | 4/1990 | Fed. Rep. of Germany | 219/56.1 |

Primary Examiner—Geoffrey S. Evans
Attorney, Agent, or Firm—Cushman, Darby & Cushman

[57] ABSTRACT

A flat-type electric wire is spot-welded to a connector terminal while the connector terminal is pressed by a pressing plate with a predetermined pressing force, so that stable spot-welding is always performed.

4 Claims, 1 Drawing Sheet

METHOD OF STABILIZING SPOT-WELDING

BACKGROUND OF THE INVENTION

The present invention relates to a method of connecting a flat-type electric wire with a connector terminal in the field in which high reliability is required, such as for example, the inside of an information apparatus such as a computer or the like, between such apparatuses, or electric or control parts of a car, and so on.

As a method of connecting a flat-type electric wire with a connector terminal with high reliability, a conventional method has been employed in which a terminal portion of a flat-type electric wire is subjected to terminal treatment so that at least one surface of the conductor of the terminal portion is exposed, the conductor of the terminal portion is sandwiched between two upper and lower metal plates partially connected to each other, and the conductor and the metal plates are spot-welded to each other.

The state in which the spot-welding described above is being carried out, is as shown in FIG. 2 in which a current is made to flow between upper and lower electrodes 4 and 5 so that a conductor 8 of a flat-type electric wire 2 and a metal terminal 1 sandwiching the conductor 8 are fused to each other at a projection portion 10. In the case where an insulator 9 is remained on one surface of the flat-type electric wire at its terminal portion (because if insulation is removed from both surfaces to leave only the conductor, a trouble such as disorder in pitch or the like is apt to happen, terminal treatment is carried out so as to expose only one surface of the conductor), a current, for example, of about 300-500 A is first made to flow so as to fuse the insulator at the terminal portion, and then a large current of 1-1.5 KA is made to flow so as to fuse the conductor with the metal terminal.

In order to apply such spot-welding successively to a number of products as a part of a manufacturing process and in order to carry out the spot-welding always stably to all the products, it is necessary to always stabilize the contact resistance between the conductor of the flat-type electric wire and the metal terminal. It is a countermeasure to provide the projection portion 10 shown in FIGS. 1 and 2. Even if such a countermeasure is taken, however, the contact resistance is apt to become unstable because of variations in height of a caulked portion 7 of the terminal shown in FIGS. 1 and 2 or variations in thickness of the flat-type electric wire. Particularly in the case where the contact resistance becomes large, there happens a disadvantage that an overcurrent flows into a terminal root portion 11 shown in FIGS. 1 and 2 to burn off the terminal root portion.

SUMMARY OF THE INVENTION

In order to solve such problems as described above, a pressing plate is provided so as to always press a terminal with a predetermined pressing force and to make an overcurrent flow into an earth. As a result, the contact resistance between a conductor and a metal terminal is made stable and spot-welding can be carried out always preferably.

DETAILED DESCRIPTION OF THE INVENTION

Figure 1:
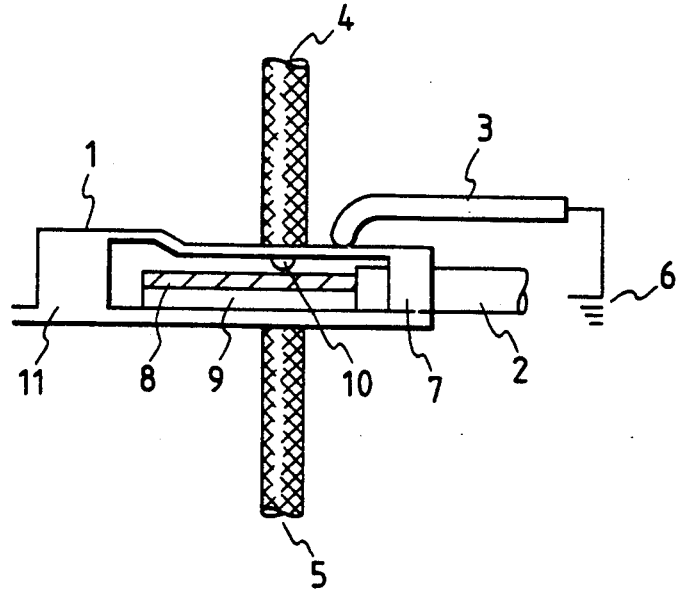
FIG. 1 shows the spot-welding method according to the present invention.
Figure 2:
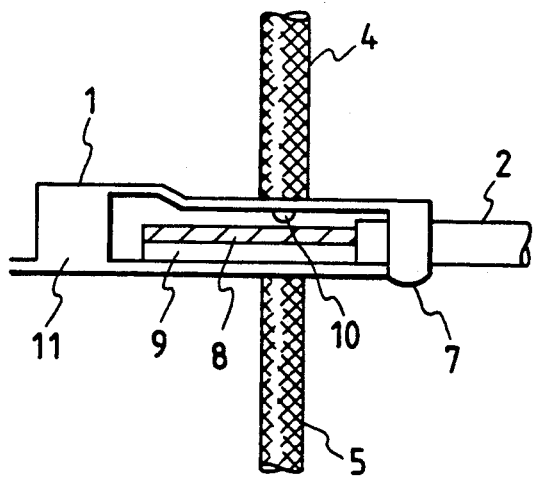
FIG. 2 shows a conventional spot-welding method.

There was prepared a flat-type electric wire in which a plurality of solder-plated rectangular copper conductors 0.14 mm in thickness and 1.5 mm in width arranged with a predetermined pitch were laminated with pieces of composite tape of polyester and PVC from above and below, and one surface of a conductor portion at the end of the flat-type electric wire was exposed by 5 mm. As shown in FIG. 1, the exposed conductor portion was sandwiched from above and below between portions of a terminal 1 obtained by carrying out gold-plating (1 $\mu$m thick) on foundation nickel-plating (1.5 $\mu$m thick) formed on 0.4 mm thick phosphorus bronze. A voltage was applied onto the terminal 1 from above and below through tungsten electrodes 4 and 5 having 1.5 mm$\phi$ flat-end surfaces while pressing the terminal 1 with a predetermined load (4 Kg) by means of a brass pressing plate 3 so that a preheating current of 0.5 KA was made to flow for six cycles each having a period of 0.02 seconds to thereby fuse an insulating film, and then a welding current of 1.5 KA was made to flow for about 0.02 seconds. The similar operation was carried out 1000 times, and preferable spot-welding could be performed every time.

As described above, spot-welding is carried out while the terminal is being pressed by the pressing plate with a predetermined load, so that products superior in welding quality can be stably manufactured. Accordingly, there are significant effects that it is possible to reduce a rate of faults or the like if the method is used for making spot welding in signal transmission paths in computers or in electronic signal transmission paths in cars.

What is claimed is:

1. A method of spot-welding a flat-type electric wire and a connector terminal, comprising the steps of:
    sandwiching an end portion of said flat-type electric wire between portions of said connector terminal;
    applying a predetermined pressing force to said connector terminal by a pressing plate; and
    applying a voltage to said connector terminal.
2. A method of spot-welding according to claim 1, wherein an overcurrent is made to flow through said pressing plate.
3. A method of spot-welding according to claim 1, wherein said pressing plate is selected from a group consisting of good conductors.
4. A method of spot-welding according to claim 1, wherein said pressing plate is selected from a group consisting of brass and copper.

* * * * *